(12) United States Patent
Watanabe et al.

(10) Patent No.: US 8,279,732 B2
(45) Date of Patent: Oct. 2, 2012

(54) OPTICAL DISC DRIVE AND OPTICAL INFORMATION READ METHOD

(75) Inventors: Koichi Watanabe, Hachioji (JP); Manabu Shiozawa, Yokohama (JP)

(73) Assignees: Hitachi-LG Data Storage, Inc., Tokyo (JP); Hitachi Consumer Electronics Co., Ltd., Tokyo (JP)

(*) Notice: Subject to any disclaimer, the term of this patent is extended or adjusted under 35 U.S.C. 154(b) by 126 days.

(21) Appl. No.: 12/640,353

(22) Filed: Dec. 17, 2009

(65) Prior Publication Data

US 2010/0157770 A1 Jun. 24, 2010

(30) Foreign Application Priority Data

Dec. 22, 2008 (JP) ................... 2008-324919

(51) Int. Cl.
*G11B 11/00* (2006.01)
(52) U.S. Cl. .................. 369/53.26; 369/53.3
(58) Field of Classification Search .............. None
See application file for complete search history.

(56) References Cited

U.S. PATENT DOCUMENTS

| | | | | |
|---|---|---|---|---|
| 6,853,657 B2 * | 2/2005 | Althaus et al. | ............ | 372/38.02 |
| 2003/0072233 A1 * | 4/2003 | Naoi et al. | ............ | 369/47.53 |
| 2004/0202216 A1 * | 10/2004 | Fairgrieve | ............ | 372/38.07 |
| 2004/0223438 A1 * | 11/2004 | Kura et al. | ............ | 369/53.26 |
| 2007/0121446 A1 | 5/2007 | Shiozawa et al. | | |
| 2007/0280316 A1 * | 12/2007 | Kitamura | ............ | 372/38.02 |
| 2008/0068947 A1 * | 3/2008 | Asada et al. | ............ | 369/47.51 |
| 2009/0074018 A1 | 3/2009 | Senga et al. | | |
| 2010/0172230 A1 * | 7/2010 | Furumiya | ............ | 369/116 |

FOREIGN PATENT DOCUMENTS

| | | |
|---|---|---|
| EP | 1936611 A1 * | 6/2008 |
| JP | 05-299738 | 11/1993 |
| JP | 2006-048885 | 2/2006 |
| JP | 2007234624 A * | 9/2007 |

* cited by examiner

*Primary Examiner* — Paul Huber
(74) *Attorney, Agent, or Firm* — Antonelli, Terry, Stout & Kraus, LLP.

(57) ABSTRACT

An HF waveform prevailing during a read operation varies due, for instance, to changes in the ambient temperature of an optical disc drive and variations in the characteristics of a laser. This degrades read performance and decreases the number of rewritable disc read operations. To address the above problems, an optical disc drive and an optical information read method are disclosed. The disclosed optical disc drive and optical information read method vary an HF amplitude in relation to the resistance, differential resistance, or temperature of the laser.

9 Claims, 17 Drawing Sheets

HF LIGHT EMISSION PULSE ← HF CURRENT PULSE $\eta = \Delta P / \Delta I$

FIG.8

| HF AMPLITUDE CONTROL REGISTERS | LD RESISTANCE | | |
| --- | --- | --- | --- |
| | LOW | MIDDLE | HIGH |
| LD TEMPERATURE — LOW | REG1 | REG4 | REG7 |
| LD TEMPERATURE — MIDDLE | REG2 | REG5 | REG8 |
| LD TEMPERATURE — HIGH | REG3 | REG6 | REG9 |

FIG.13

| MEASURED LD RESISTANCE | | |
|---|---|---|
| LOW | MIDDLE | HIGH |
| REG1 | REG2 | REG3 |

FIG.17A

| HF FREQUENCY CONTROL REGISTERS ||
|---|---|
| 1x–6x | 6x–12 |
| a | b |

FIG.17B

| HF AMPLITUDE CONTROL REGISTERS | | LD RESISTANCE | | |
|---|---|---|---|---|
| | | LOW | MIDDLE | HIGH |
| LD TEMPERATURE | LOW | REG1 | REG4 | REG7 |
| | MIDDLE | REG2 | REG5 | REG8 |
| | HIGH | REG3 | REG6 | REG9 |

FIG.17C

| HF AMPLITUDE CONTROL REGISTERS | | LD RESISTANCE | | |
|---|---|---|---|---|
| | | LOW | MIDDLE | HIGH |
| LD TEMPERATURE | LOW | REG4 | REG7 | REGa |
| | MIDDLE | REG5 | REG8 | REGb |
| | HIGH | REG6 | REG9 | REGc |

OPTICAL DISC DRIVE AND OPTICAL INFORMATION READ METHOD

CLAIM OF PRIORITY

The present application claims priority from Japanese Patent Application JP 2008-324919 filed on Dec. 22, 2008, the content of which is hereby incorporated by reference into this application.

BACKGROUND OF THE INVENTION

1. Field of the Invention

The present invention relates to an optical information read method for reading information from an optical recording medium (hereinafter referred to as the optical disc) by driving and controlling a modulated optical waveform. The present invention also relates to an optical disc drive that implements the above optical information read method.

2. Description of the Related Art

The storage capacities of optical disc drives have been enlarged so that CDs using a conventional infrared laser (having a wavelength of 780 nm) and DVDs using a red laser (having a wavelength of 650 nm) are widely used. Further, Blu-ray Discs (BDs) using a blue laser (having a wavelength of 405 nm) are also commercialized and recently marketed.

When reading the information recorded on an optical disc, it is necessary to minimize semiconductor laser noise. The semiconductor laser noise is called "RIN" (Relative Intensity Noise) and generally expressed by the following equation:

$$RIN = 10 \times \log(\Delta P^2 / P^2 \times 1/\Delta f)(dB/Hz)$$

where $\Delta P$ is an AC component of optical output, P is a DC component of optical output, and $\Delta f$ is a measurement bandwidth. The definition formulated in a written BD standard states that the RIN must be not higher than $-125$ dB/Hz.

A high-frequency superposition method (HF: High Frequency) is known as an RIN reduction method for use with an optical disc read device. This method turns on and off a laser oscillation at a high frequency to maintain a multi-longitudinal-mode oscillation state, thereby suppressing changes in the optical output of a laser diode that are caused by reflected-light feedback from an optical disc. The RIN is related to the HF modulation factor of a semiconductor laser (the ratio between $P_{HF}$ and Pa ($P_{HF}$/Pa) where $P_{HF}$ is a light pulse peak power prevailing at the time of high-frequency superposition and Pa is the average power of all high frequencies), and controlled by adjusting the HF modulation factor.

Meanwhile, the oscillation characteristics of a semiconductor laser vary with temperature. Therefore, when the operating temperature varies, the power of emitted light also varies. An invention disclosed in Japanese Patent Application Laid-Open Publication No. 2006-48885 provides a drive device for a semiconductor laser (laser driver (LDD)) with a temperature sensor, superposes a sub-current pulse, which compensates for a temperature-induced change, over a main current pulse, which drives the semiconductor laser, when the two pulses are in the same phase, and supplies the result of superposition to the semiconductor laser to avoid a temperature-induced recording pulse power change.

Another invention disclosed in Japanese Patent Application Laid-Open Publication No. 1993-299738 provides an optical disc drive that drives a semiconductor laser by a high-frequency superposition method. This optical disc drive observes the light emission intensity of the semiconductor laser at appropriate timing when a high frequency current is superposed over a drive current supplied from a laser driver to the semiconductor laser and when such high frequency is not superposed the drive current, and individually controls the amplitude of a reference current (DC current) for driving the laser and the amplitude of the high-frequency current to be superposed, thereby maintaining the modulation factor of the laser within a definite range.

SUMMARY OF THE INVENTION

Laser temperature changes during a read operation have not caused a significant problem for optical disc drives that use a conventional red laser. When the red laser is used, temperature-induced HF modulation factor changes are relatively small so that the RIN does not significantly vary with temperature. In addition, a small distortion of a read signal waveform can be corrected, for instance, by a waveform equalizer in a read signal processing system. When, on the other hand, a blue laser is used, HF modulation factor changes with temperature are extremely greater than when the red laser is used. Thus, the RIN greatly varies with temperature. In addition, the characteristics of a blue laser vary to a greater extent than the red laser due to technological difficulties in manufacturing.

Japanese Patent Application Laid-Open Publication No. 2006-48885 has disclosed a method of preventing write pulse power from varying with temperature, but has not disclosed a method of controlling a laser during a read operation. Japanese Patent Application Laid-Open Publication No. 1993-299738 has disclosed a method of preventing an HF modulation factor from varying with temperature; however, a light emission power measurement mechanism is necessary for directly measuring light emission power during the use of HF. When observing the light emission pulse intensity of a laser at the time of high-frequency superposition, it is necessary to use a photodetector that is sensitive enough to follow the rise and fall of a light emission pulse. The rise and fall speeds of a light emission pulse depend on the relaxation frequency of laser oscillation. The high frequency (the reciprocal of a light emission pulse interval) of currently available BD lasers is approximately 400 MHz. However, their relaxation frequency is on the order of GHz. Therefore, it is practically impossible to measure the light intensity of such a high-speed light pulse. Further, the invention disclosed in Japanese Patent Application Laid-Open Publication No. 2006-48885 requires a light pulse observation circuitry including a photodetector, a sample-and-hold circuit, and a differential amplifier, thereby enlarging the scale of a laser driver circuit.

The present invention has been made in view of the above circumstances, and provides an optical information read device and an optical information read method by using a practical circuitry that is capable of consistently controlling the read power of a laser even when there are variation factors such as those of laser characteristics variation and temperature characteristics variation.

The present invention addresses the above-described problems by providing a laser driver with a register that stores an HF amplitude setting appropriate for the resistance value or differential resistance value of a semiconductor laser and controlling the register setting in accordance with the resistance or differential resistance value of the laser. A value appropriate for semiconductor laser temperature may be stored in the register as the HF amplitude setting.

The HF amplitude may be determined in accordance with the resistance or differential resistance value or the temperature of the semiconductor laser. However, it is preferred that control be exercised by using both the resistance value (or differential resistance value) and temperature. Using both the temperature and differential resistance makes it possible to make corrections while considering temperature characteristics in addition to the resistance or differential resistance of an LD.

The present invention makes it possible to avoid a decrease in the number of read operations without significantly degrading the read performance when ambient temperature and laser variations are encountered.

BRIEF DESCRIPTION OF THE DRAWINGS

Embodiments of the present invention will be described in detail based on the following figures, wherein:

FIG. 8 is a diagram illustrating the configuration of an HF amplitude control register table according the first embodiment;

FIG. 13 is a diagram illustrating the configuration of an HF amplitude control register table according to the second embodiment;

FIGS. 17A, 17B, and 17C are diagrams illustrating HF pulse waveform control register tables according to the third embodiment.

DETAILED DESCRIPTION OF THE INVENTION

Specific embodiments will be described below. However, the related art will be explained before the description of specific embodiments as needed to facilitate the understanding of the present invention. The related art will be described together with the findings that are empirically obtained by the inventors of the present invention.

(HF Modulation Factor)

Figure 1:
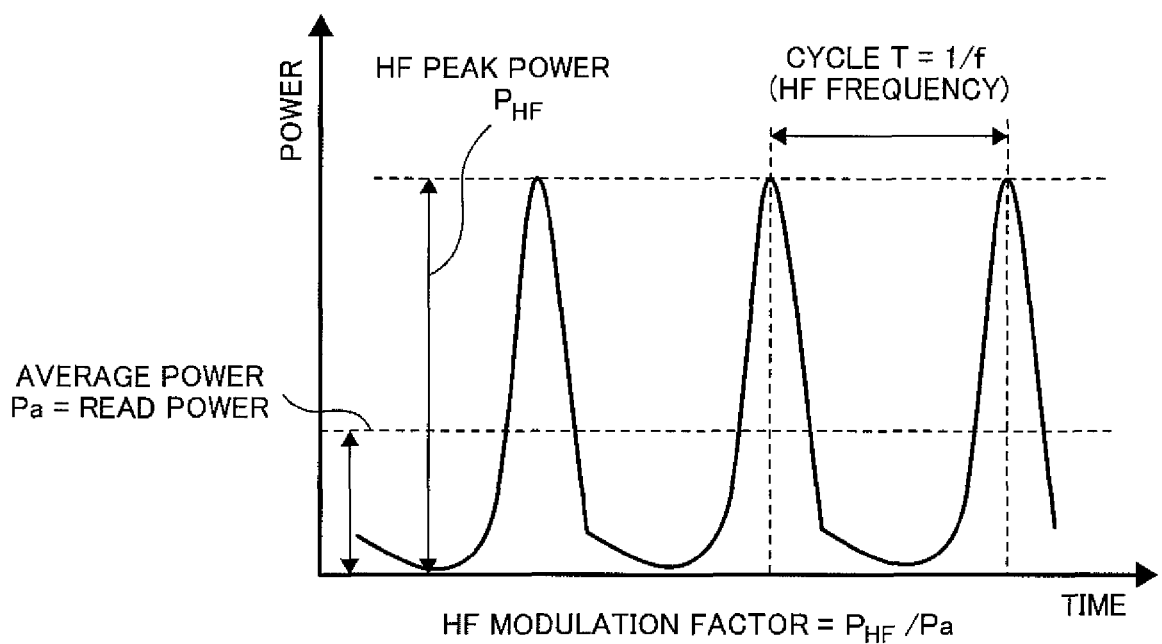
FIG. 1 is a diagram that illustrates high-frequency superposition (HF)

FIG. 1 is a schematic diagram illustrating an HF modulation factor $M_{HF}$. The schematic diagram in FIG. 1 shows the waveform of a pulse of light emitted from a semiconductor laser. In FIG. 1, the horizontal axis represents time, whereas the vertical axis represents optical power. When it is assumed that a light pulse is generated at fixed time intervals (cycle) as shown in FIG. 1, a high frequency is the reciprocal of the cycle. As mentioned earlier, the HF modulation factor $M_{HF}$ is defined as the ratio between $P_{HF}$ and Pa, that is, $P_{HF}$/Pa, where $P_{HF}$ is the peak power of a high-frequency light pulse and Pa is the average power of all high frequencies. The average power Pa is calculated by dividing the surface integral of a light emission waveform by integration time, and can be measured with a power monitor.

(Differential Resistance)

Figure 2A:
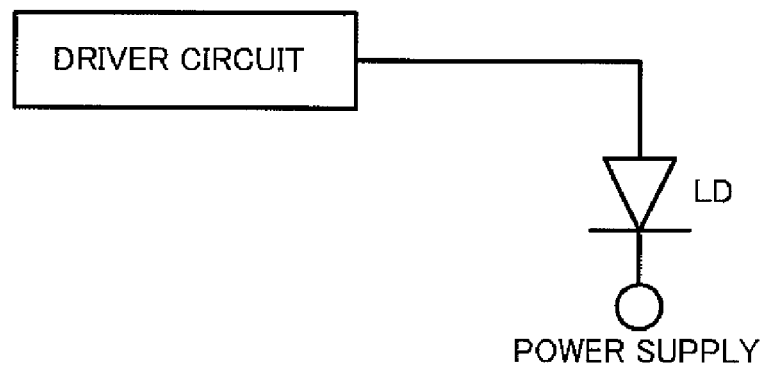
FIG. 2A is a wiring diagram illustrating the connection between a laser driver and a laser.
Figure 2B:
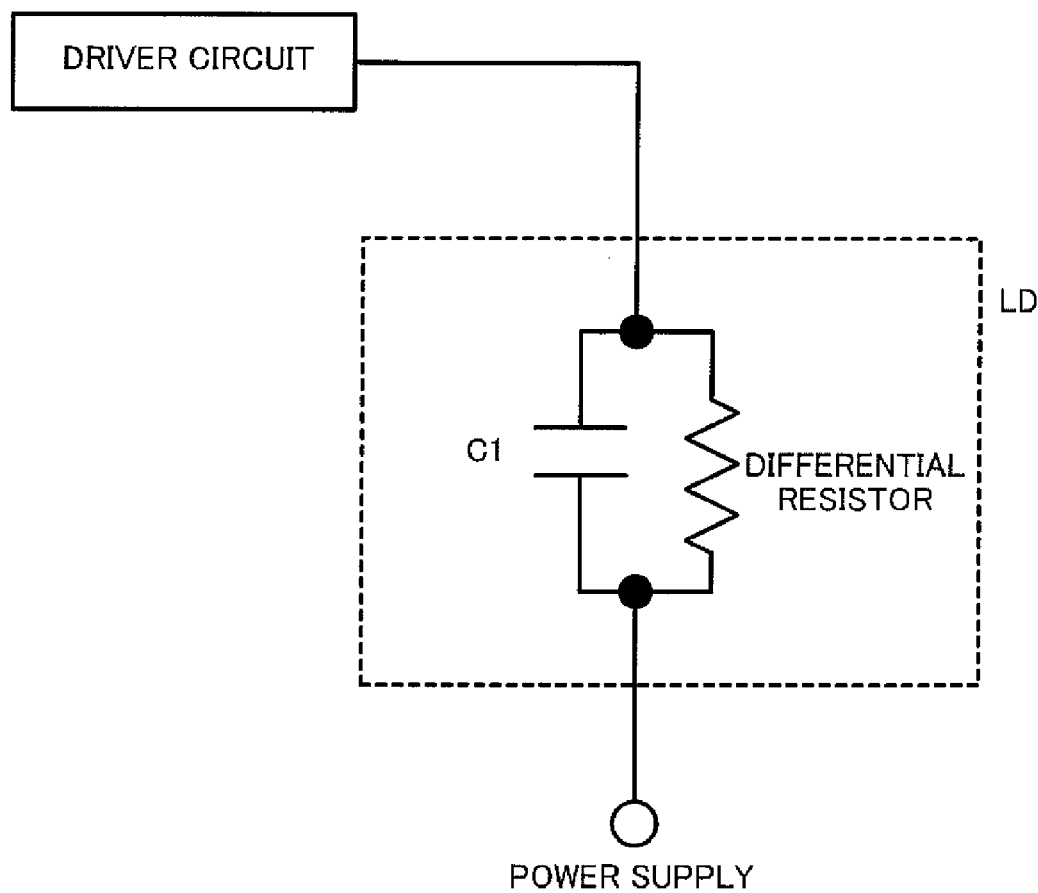
FIG. 2B is a diagram illustrating a circuit model representing the connection between a laser driver and a laser.

FIG. 2A is a wiring diagram illustrating the wiring relationship between a laser diode (LD), an LD driver (LDD), and an LD driving power supply, which are incorporated in an optical disc drive. FIG. 2B shows a circuit model that is obtained by replacing the LD in FIG. 2A with an equalizing circuit. As shown in FIG. 2B, the LD has a capacitive component and a resistive component, which are in parallel with the power supply and driver. Resistance is generally expressed as R=V/I. In the case of a nonlinear device such as a laser, however, the relationship between current, resistance, and voltage is not always linear. In such an instance, a resistance value is expressed as the differential of a voltage with respect to a current (dR=dV/dI), and the value dR is referred to as differential resistance.

Figure 3:
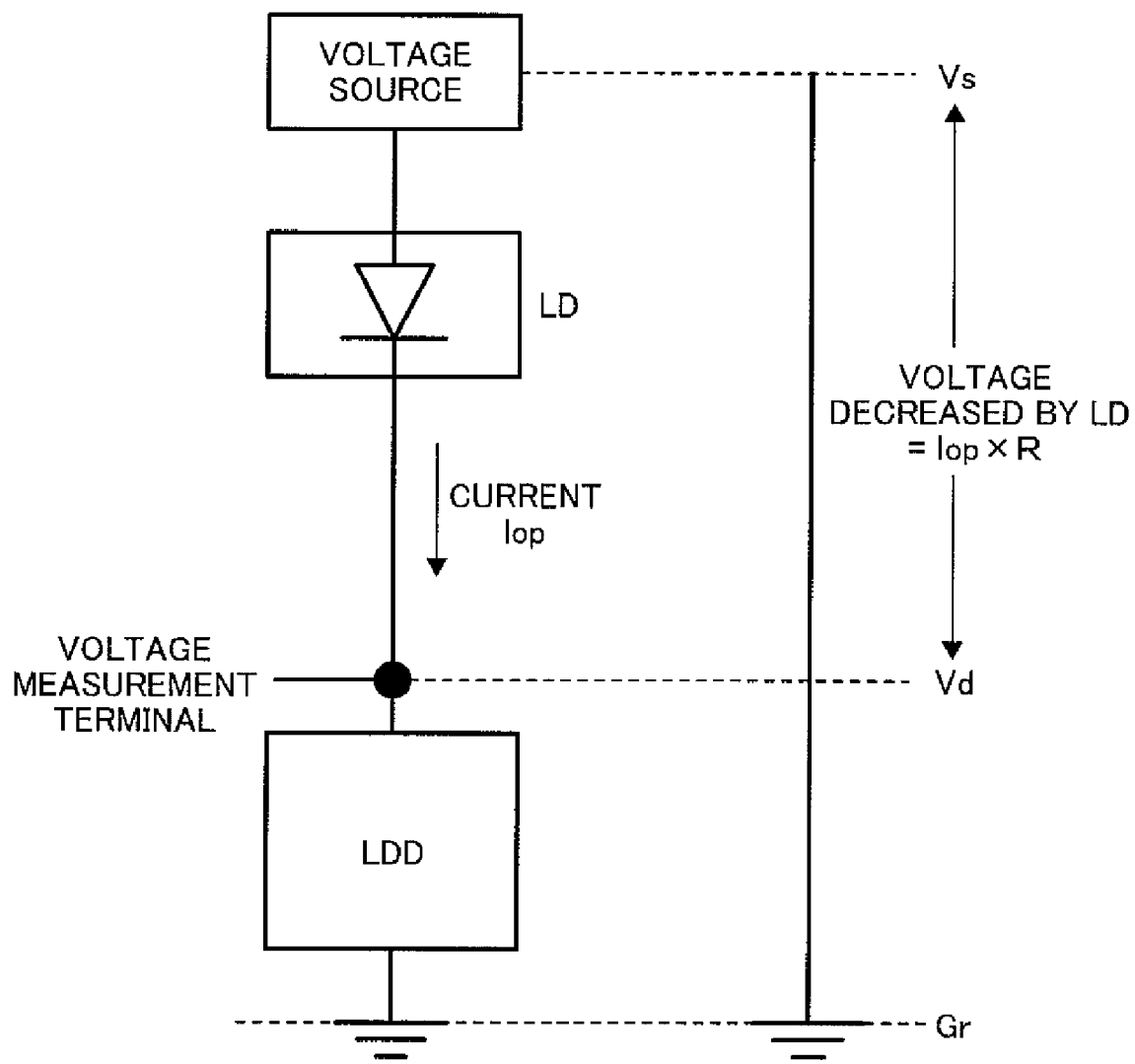
FIG. 3 is a diagram illustrating resistance sensing of a laser.

A differential resistance measurement method will now be described with reference to FIG. 3. FIG. 3 is a schematic diagram illustrating the potentials of the LD, LDD, and LD driving power supply. If, during an LD operation, a voltage Vs is applied to the LD and a current $I_{OP}$ is supplied from the LDD to the LD, the potential of a voltage source relative to a ground potential is Vs. The amount of voltage decrease in the LD is the difference between the supply voltage Vs and the potential of the LDD relative to the ground potential. Therefore, the amount of voltage decrease in the LD can be determined by measuring the potential between the LDD and an LD connection. If the potential between the LDD and LD connection is Vd, the resistance value of the LD can be determined from the equation Vs−Vd=$I_{OP}$×R. The value R, which is obtained in this instance, corresponds to the differential resistance because it is a resistance value prevailing when the current is $I_{OP}$. A measured value of R varies, for instance, with laser operating temperature and laser characteristics variations.

(Relationship Between Laser Resistance Value and Operating Temperature and Relationship Between HF Modulation Factor and Temperature)

Control needs to be exercised to maintain the HF modulation factor within a definite range so that it remains unaffected by ambient temperature and laser variations. For example, a BD-RE standard for HF states that the modulation frequency and HF modulation factor must be 400 MHz±40 MHz and 7.0±0.7, respectively. The standard also states that BD-RE discs must be capable of performing 1,000,000 read operations under conditions where a 1×-speed, single-layer disc is used at a read power (average power) of 0.3 mW.

Figure 4A:
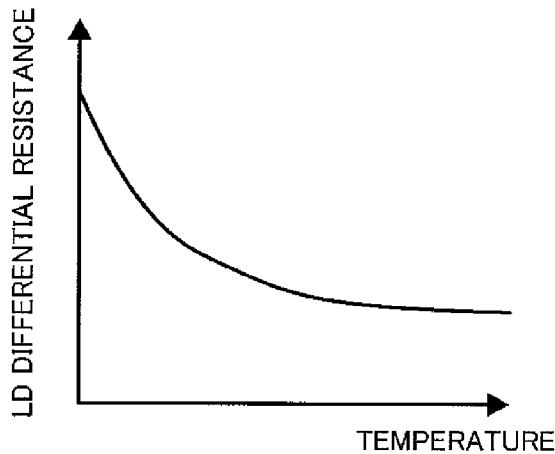
FIG. 4A is a diagram illustrating the relationship between temperature and a laser's differential resistance.
Figure 4B:
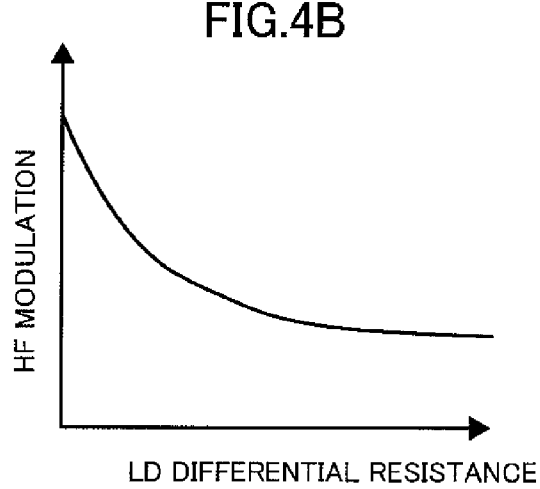
FIG. 4B is a diagram illustrating the relationship between differential resistance and HF modulation.
Figure 4C:
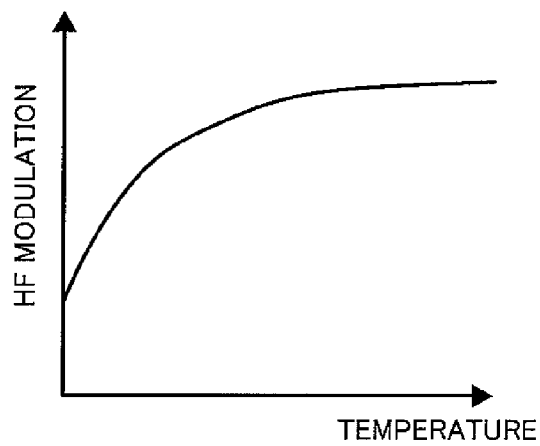
FIG. 4C is a diagram illustrating temperature and resistance sensing of a laser.

Meanwhile, when a semiconductor laser operates continuously for a long period of time, it produces heat due to a current or becomes affected by the ambient temperature inside an optical disc drive. FIG. 4A shows the relationship between the differential resistance value and temperature of a laser. The differential resistance of an LD tends to decrease with an increase in the LD's operating temperature. Further, the HF modulation factor tends to decrease with an increase in the laser's differential resistance as shown in FIG. 4B. FIG. 4C shows the temperature dependence of the HF modulation factor, which is derived from FIGS. 4A and 4B. FIG. 4C indicates that the HF modulation factor increases with an increase in the temperature. As mentioned earlier, the HF modulation factor is related to the RIN (semiconductor laser noise). Therefore, control needs to be exercised so that the HF modulation factor is maintained within a definite range to reduce the RIN. Under normal conditions, the LD's temperature characteristics are not taken into account when optical disc read control is exercised. Therefore, an HF modulation factor controller exercises HF modulation factor control by using default control parameters. However, the HF modulation factor varies in accordance with changes in the laser temperature. Therefore, the HF modulation factor may deviate from a target control range due to prolonged continuous use or ambient temperature.

In addition, the LD's characteristics variation also causes a problem. More specifically, some of mass-produced LDs are such that the voltage characteristics and temperature characteristics of a resistance value vary to a greater extent than those of standard products. Particularly, lasers having a low differential resistance are problematic. If such an LD is used in combination with an LDD that is produced to match standard characteristics, the HF modulation factor becomes greater than a target value due to continuous use (see FIG. 4C). If the HF modulation factor is greater than the target value, the peak power of a laser beam incident on an optical disc may increase to erase data. Because of the characteristics, for instance, of a recording material, there is an upper limit to the number of times an optical disc can be rewritten. Therefore, the aforementioned data erasure decreases the number of times the optical disc can be read. When a blue laser is used, the influence of temperature changes on the HF modulation factor becomes more significant because the characteristics of the blue laser vary to a greater extent than those of a red laser.

(Light Emission Characteristics of Laser and Control Method for Multi-Longitudinal-Mode Oscillation)

Figure 5A:
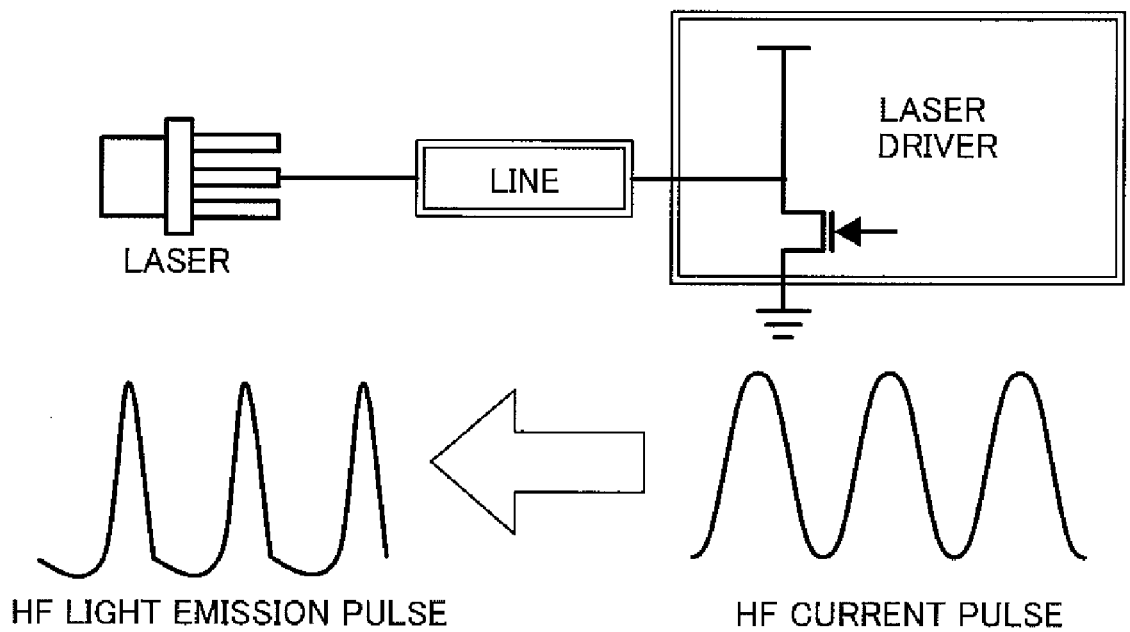
FIG. 5A is a diagram illustrating the relationship between an HF current pulse and an HF light emission pulse.

FIG. 5A is a schematic diagram illustrating the relationship between a drive current pulse generated from a laser driver and an HF pulse output from a laser. As shown in the figure, an HF light emission pulse that is actually output from the laser differs from an HF current pulse output from the laser driver. Such a difference is due to the variation of laser's resistance or differential resistance and the influence of laser's relaxation oscillation.

Figure 5B:
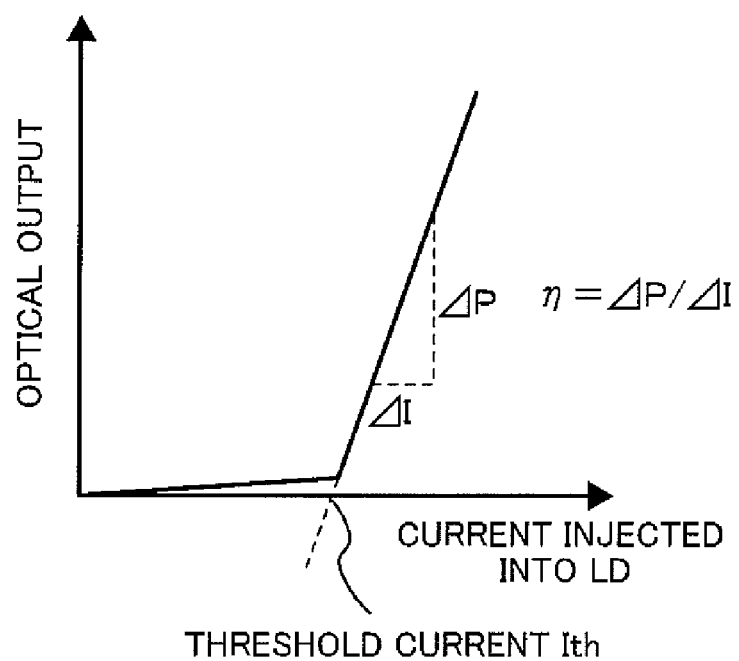
FIG. 5B is a diagram illustrating the current characteristics of a laser's optical output.

FIG. 5B shows how laser radiation power varies with a current supplied from an LDD to an LD. The light emission characteristics of a laser are expressed by a laser's oscillation start current value $I_{th}$ and light emission power efficiency (gradient) η relative to a drive current. These two values unambiguously determine a waveform of light emitted from a laser (light emission waveform). If, in this instance, an off-state current value is set to be smaller than the oscillation start current value $I_{th}$, the light emission waveform alternates between an on-state and off-state. This intermittent drive makes it possible to oscillate the laser in a multi-longitudinal mode.

First Embodiment

Figure 6:
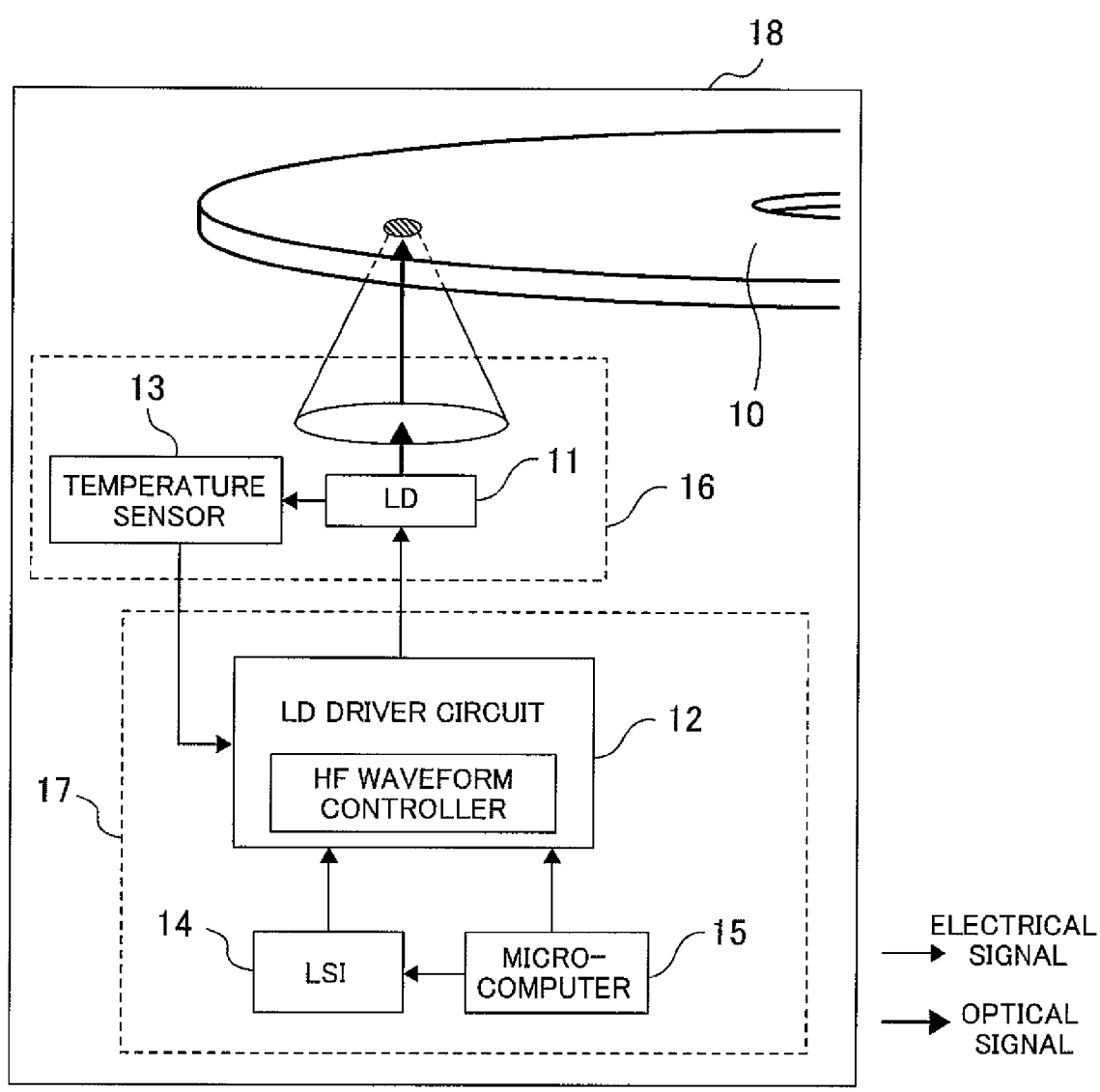
FIG. 6 is a diagram illustrating the overall configuration of an optical disc drive according to a first embodiment.

FIG. 6 is a schematic diagram showing the outline of an optical disc drive according to a first embodiment of the present invention. The optical disc drive 18 according to the present embodiment includes, for instance, a spindle (not shown), an optical pickup 16, and a read/write signal processing system 17. The spindle retains an optical disc 10, which is a portable recording medium. The optical pickup 16 irradiates the optical disc 10 with a laser beam and detects light reflected from the optical disc 10. The read/write signal processing system 17 processes the light emitted from the optical pickup 16 or a signal detected by the optical pickup 16 during a read or write operation.

The optical pickup 16 according to the present embodiment includes a semiconductor laser diode (LD) 11 and a temperature sensor 13 for the LD. The LD 11 serves as a light source. The read/write signal processing system 17 according to the present embodiment includes, for instance, an LD driver circuit (LDD) 12, an LSI 14, and a microcomputer 15. The LD driver circuit (LDD) 12 supplies a predetermined HF pulse current to the LD 11 during a read operation. The LSI 14 generates a predetermined write signal waveform during a write operation. The microcomputer 15 operates firmware that provides integrated control over the operation of the entire optical disc drive. The LDD according to the present embodiment includes an HF pulse waveform controller.

As mentioned earlier, control needs to be exercised to maintain HF amplitude variation within a definite range. To achieve such a purpose, it is necessary to adjust the amount of control to be provided by the HF pulse waveform controller. Basically, there are two different control amount adjustment methods. The first method is to measure the operating temperature during a read operation, acquire the information about the differential resistance of an incorporated laser from the pickup, tabulate HF settings for a read operation, and exercise control by using the tabulated HF settings. The second method is to sense the laser's differential resistance during a read operation and control the settings related to HF pulse waveform control in accordance with the sensed differential resistance.

An HF pulse waveform is controlled by changing the setting (register value) of a waveform control register in the LD driver circuit 12. As explained earlier, the HF modulation factor $M_{HF}$ affects the quality of a read signal and the number of times a read operation is performed. It is therefore necessary to predetermine an appropriate register setting that provides a constant HF modulation factor. Meanwhile, the register value is changed by the firmware. Therefore, the microcomputer 15 according to the present embodiment retains the register value, measured information, such as the aforementioned LD differential resistance and temperature, and the relationship between the register value and measured information. In the present embodiment, the internal memory of the microcomputer 15 stores the above observed information and register value in a tabular form.

Figure 7A:
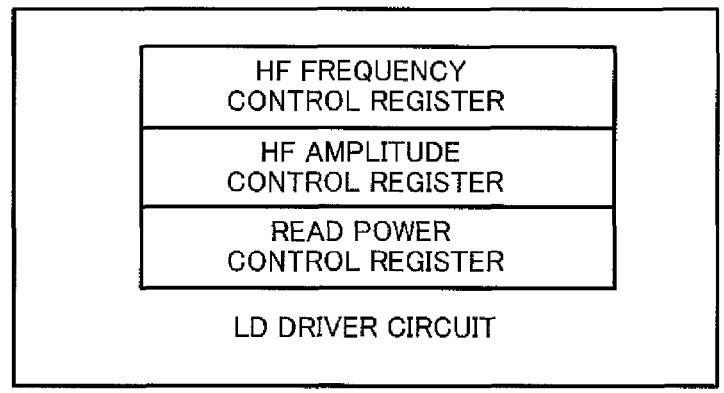
FIG. 7A is a diagram illustrating registers related to HF control of a laser driver.
Figure 7B:
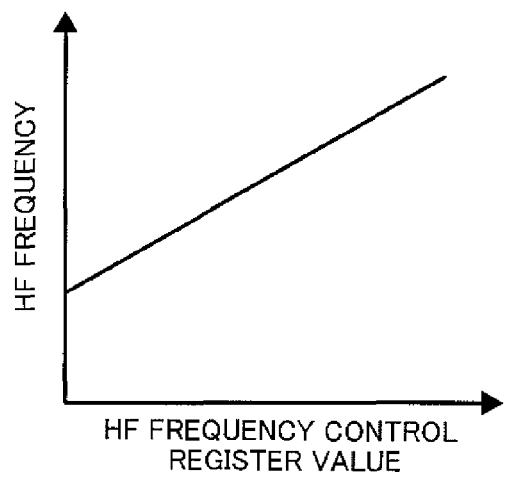
FIG. 7B is a diagram illustrating the relationship between an HF frequency control register value and an HF frequency.
Figure 7C:
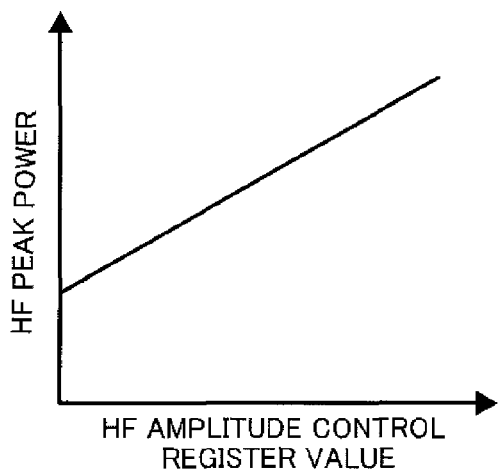
FIG. 7C is a diagram illustrating the relationship between an HF amplitude control register value and an HF amplitude.

FIG. 7A shows an exemplary configuration of control registers included in the LD driver circuit 12 shown in FIG. 6. The laser driver shown in FIG. 6 includes an amplitude control register, frequency control register, and read power control register for an HF current pulse. These three different control registers constitute the HF waveform controller shown in FIG. 6. Here, the term "HF frequency" denotes an HF pulse interval. As indicated by an example in FIG. 7B, the HF frequency can be controlled independently by the frequency control register. HF peak power can be controlled by the HF amplitude control register as indicated by an example in FIG. 7C.

The HF peak power $P_{HF}$ is determined by multiplying the value of the read power control register and the value of the HF amplitude control register. The HF conditions for a read operation can be optimized by controlling these registers.

One or more registers are optimized in a manner described above. Although the present embodiment assumes that the HF current pulse amplitude control register, frequency control register, and read power control register are used, the types and the number of control registers available for HF waveform control depend on the laser driver. Therefore, the optimum values for the HF waveform control registers included in the employed laser driver should be determined and set in the respective HF waveform control registers. Here, the term "HF waveform control registers" is a generic name representing the registers used for HF current pulse control, such as the amplitude control register, frequency control register, and read power control register.

Figure 9:
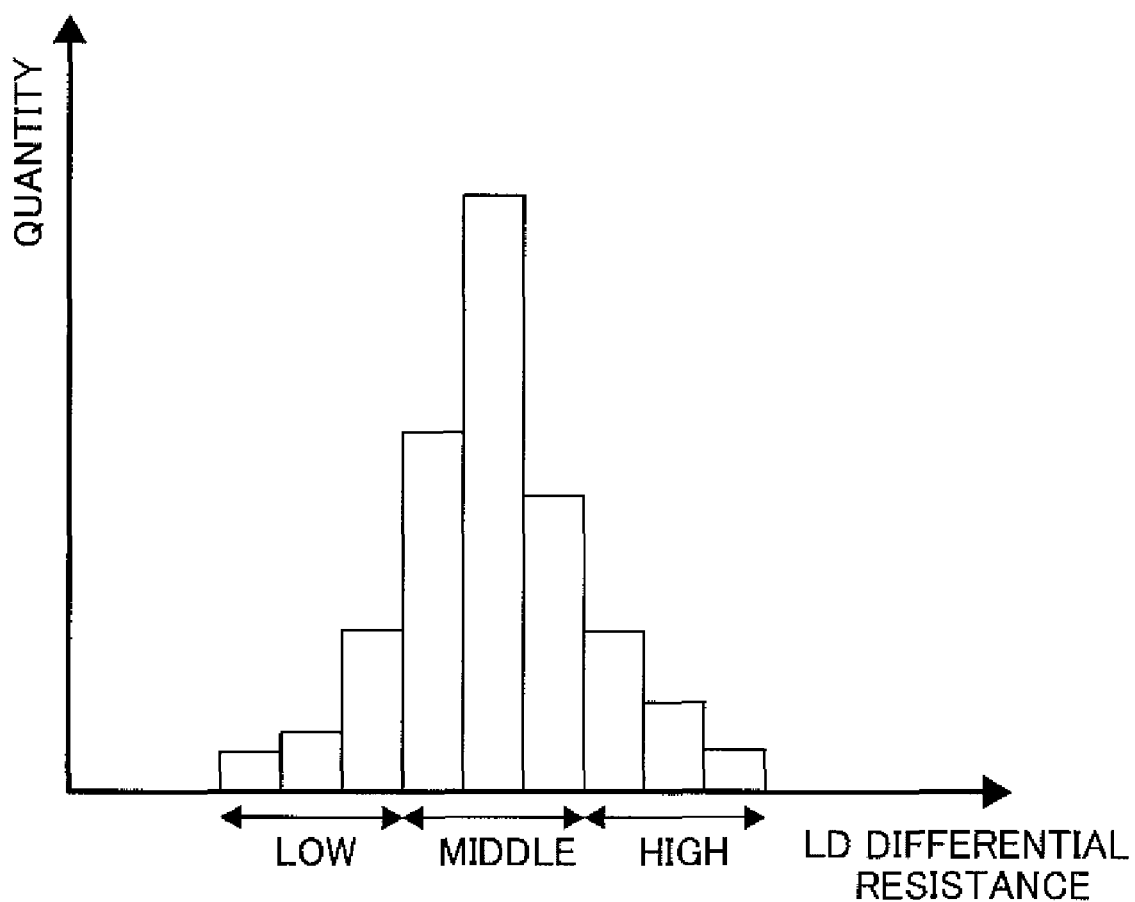
FIG. 9 is a diagram illustrating the variation of a laser's differential resistance.

FIG. 8 shows an example of an HF amplitude adjustment register table according to the present embodiment. As a laser is made of a semiconductor that varies as shown in FIG. 9, and the characteristics of the laser vary with temperature, resistance variation with the temperature should be measured beforehand. Further, a temperature table storing optimum register values for various temperatures should be prepared. Typical temperatures, such as a low temperature of 0° C., a middle temperature of 25° C., and a high temperature of 50° C., can be defined. FIG. 8 shows HF amplitude control registers as waveform control parameters for such temperatures. The above-described HF modulation factor can be changed by adjusting the HF amplitude control registers. The HF amplitude can be rendered constant by referencing the table.

The example in FIG. 8 assumes that the LD temperature range is divided into three regions (low, middle, and high). However, the number and extent of regions may be defined in accordance with a temperature range that can be compensated for by the same register setting. If, for instance, the degree of variation of the LD is relatively small, the LD temperature range may be divided into two regions (low and high). If, on the other hand, the degree of variation of the LD is relatively great, the LD temperature range should be divided into four or more regions to provide temperature compensation. In any case, it is important that the LD operating temperature range be divided into multiple regions to provide temperature compensation.

Figure 10:
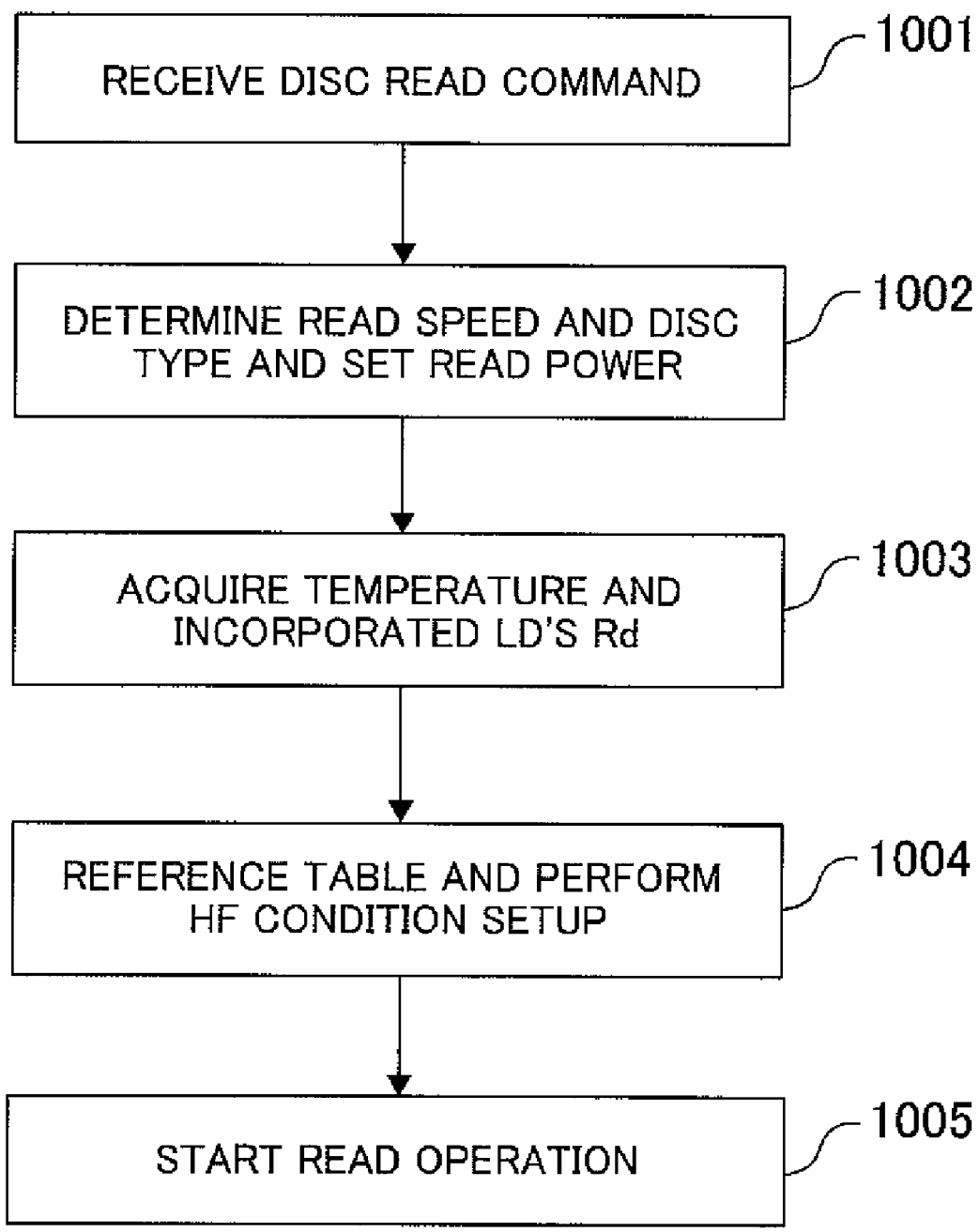
FIG. 10 is a flowchart illustrating how pulse waveform control is exercised by the optical disc drive according to the first embodiment.

FIG. 10 is a flowchart illustrating a read operation performed by the optical disc drive according to the present embodiment. A control sequence indicated in this flowchart can be divided into the following five steps (steps (1) to (5)):
(1) The firmware (hereinafter referred to as the FW) in the microcomputer receives a disc information read command from the drive (host).
(2) The FW determines, for instance, the read speed and disc type, and sets the read power.
(3) To define the HF conditions, the optical disc drive acquires a temperature measurement result. Further, the FW acquires the differential resistance information about the incorporated laser from the pickup or drive. It is assumed that the resistance information about the laser is stored in the pickup or drive.
(4) The FW references the table shown, for instance, in FIG. 8, determines the HF amplitude control register value from the temperature and LD's differential resistance, and sets the determined value.
(5) The optical disc drive starts a read operation in accordance with an HF waveform optimized by the FW. Exercising HF waveform control in this manner makes it possible to properly handle laser variation and laser differential resistance variation with temperature changes in the drive.

It is preferred that the above-described HF condition adjustment be made, for instance, when an optical disc is inserted into an optical disc reader (loaded), when an installed temperature sensor detects a change in the ambient temperature of the laser diode, after a data write operation is completed, and when an adjustment request is received from a host or other external device. Further, the information about laser radiation time recorded in the FW of the drive may be acquired to perform a second step at fixed time intervals.

When the adjustment is made at the time of loading, the adjustment is completed before activating a focus servo or tracking servo. This eliminates the necessity of interrupting a read/write operation. After a data write operation, the laser diode temperature is more likely to change than during a period before the data write operation. Therefore, when a readjustment is constantly made after a write operation, it is not necessary to measure temperature changes. Further, if the readjustment is made, for instance, at one-month intervals, it is possible to compensate for aging of the laser.

As described above, the optical disc drive according to the present embodiment controls the HF pulse waveform in accordance with the LD's characteristics, and therefore provides two advantages. The first advantage is to prevent read performance from degrading because HF optimization can be achieved. The second advantage is to significantly reduce the manufacturing cost of optical disc drives because LDs formerly labeled "defective" can be made usable.

Second Embodiment

The first embodiment does not measure the differential resistance of the laser, but references the table in accordance with the information about temperature and laser and exercises HF pulse waveform control with a certain degree of accuracy. However, a second embodiment of the present invention assumes that the optical disc drive is capable of exercising HF pulse waveform control with a measured differential resistance value. An exemplary configuration of the optical disc drive according to the second embodiment will now be described.

The overall configuration and operation of the optical disc drive according to the second embodiment are more or less similar to those of the optical disc drive according to the first embodiment. Therefore, only the difference between the first and second embodiments will be described below while omitting portions common to the first and second embodiments.

Figure 11:
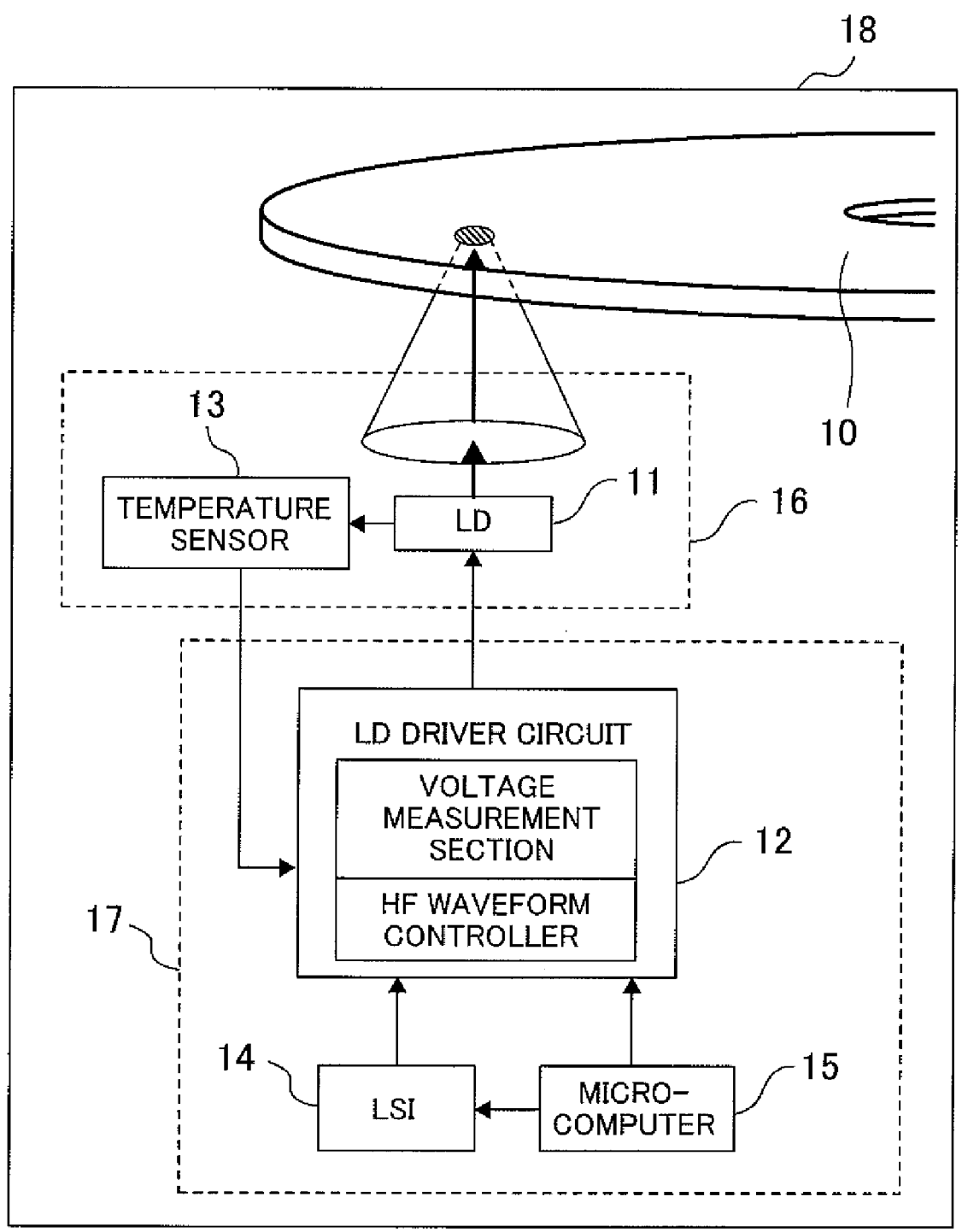
FIG. 11 is a diagram illustrating the overall configuration of an optical disc drive according to a second embodiment.

FIG. 11 shows the overall configuration of the optical disc drive according to the second embodiment. The optical disc drive shown in FIG. 11 has substantially the same configuration as the optical disc drive shown in FIG. 6. However, the optical disc drive according to the second embodiment is capable of measuring the differential resistance.

Figure 12:
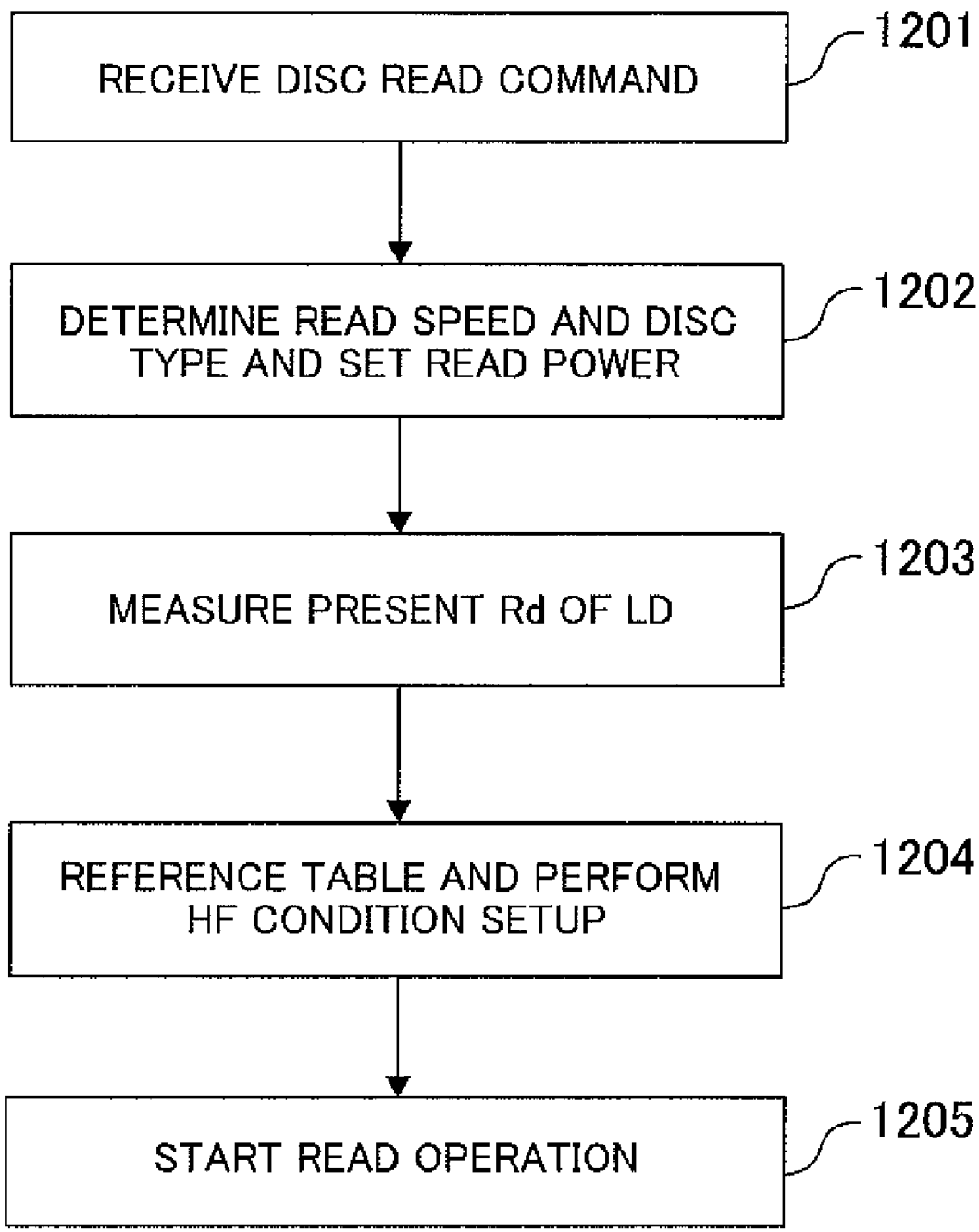
FIG. 12 is a flowchart illustrating how pulse waveform control is exercised by the optical disc drive according to the second embodiment.

FIG. 12 is a flowchart illustrating a read operation performed by the optical disc drive shown in FIG. 11. Upon receipt of a disc read request from a host device (typically a host computer) to which the optical disc drive is connected, the firmware (FW) issues a disc read command (step 1201).
(1) As is the case with the first embodiment, the FW receives a disc information read command from the drive.
(2) The FW sets read power after determining, for instance, the read speed and disc type.
(3) The optical disc drive acquires a temperature measurement result to define HF conditions, and measures the supply voltage information (Vs), the current $I_{OP}$ flowing in the LDD, and the voltage Vd at the LD connection of the LDD, which are shown in FIG. 3, to measure the resistance of the laser. The FW then determines the present laser resistance value from the measured values.

(4) The FW references the table shown in FIG. 13, determines the HF amplitude control register value from the laser's resistance value, and sets the determined value.

The optical disc drive according to the second embodiment becomes aware of the resistance or differential resistance of the LD in real time to provide HF control with increased accuracy. In this instance, temperature information may be additionally used to reference the two-parameter (temperature and resistance) table shown in FIG. 8. As mentioned earlier, when the temperature and differential resistance are both used, it possible to make corrections while considering temperature characteristics in addition to the resistance or differential resistance of the LD. A designer can choose between a one-parameter table and two-parameter table after verifying the accuracy of a drive operation.

Third Embodiment

A third embodiment of the present invention will now be described. The optical disc drive according to the third embodiment is capable of controlling the HF frequency in accordance with a read speed. The following description deals with an example in which a BD is used.

Figure 14:
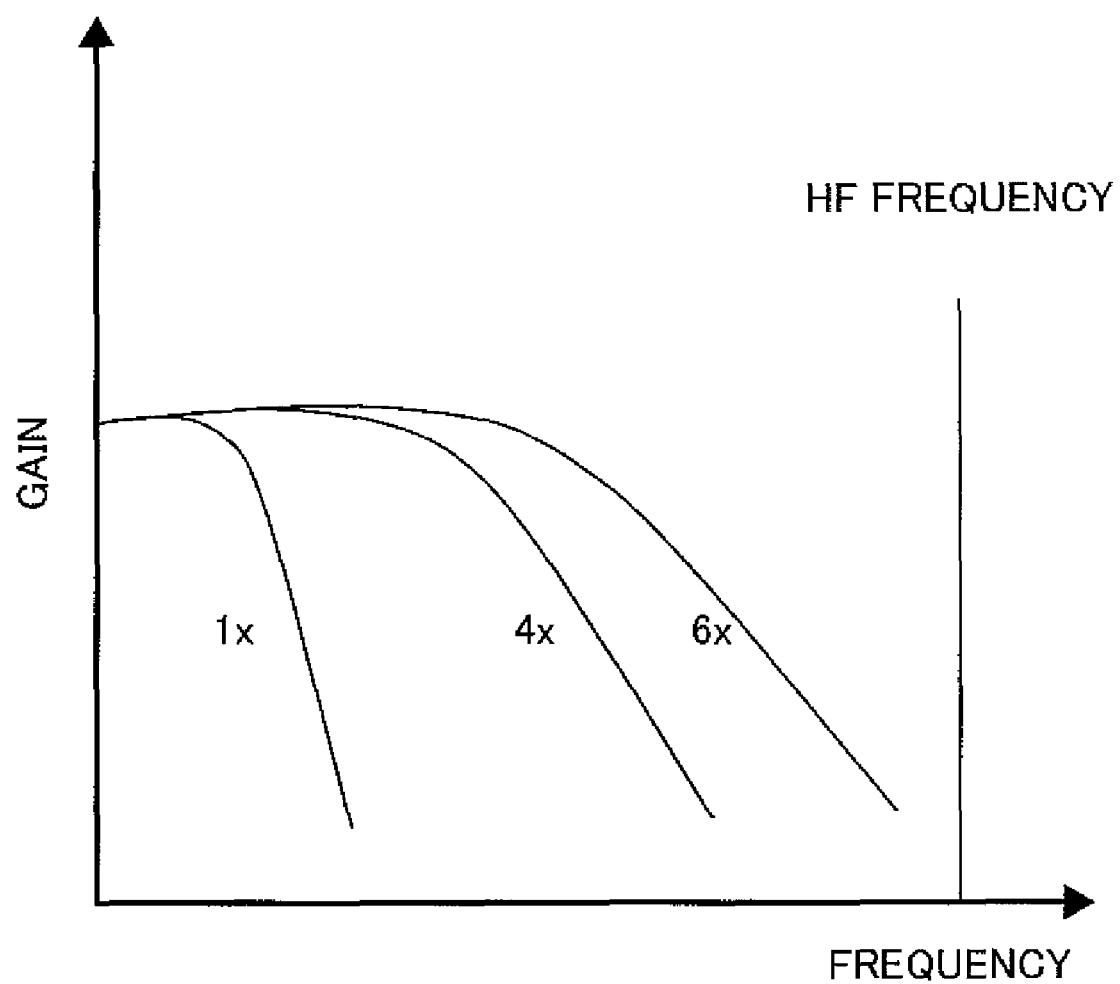
FIG. 14 is a diagram illustrating the relationship between a read speed, a read band, and an HF frequency.

FIG. 14 shows the relationship between a read band and a read gain. The horizontal axis represents the read band, whereas the vertical axis represents the read gain. As shown in FIG. 14, the read band tends to widen with an increase in the read speed. When the read speed increases, the read band and HF frequency become close to each other so that a problem arises with an HF itself because it leaks into a read signal.

As of July 2008, the highest standardized BD read speed is 6×. The BD standard states that the HF frequency is 400 MHz. However, if the read speed becomes higher in the future, the HF frequency needs to be increased in accordance with the read speed. For example, the HF frequency needs to be 400 MHz for a read speed between 1× and 6× and 800 MHz for a read speed between 6× and 12×. It is highly probable that the HF frequency has to be changed depending on the read speed range. In view of these circumstances, the optical disc drive according to the present embodiment provides HF frequency control in addition to HF pulse waveform amplitude control, which has been described in conjunction with the first and second embodiments. Therefore, the HF frequency control register is tabularized in addition to the HF current pulse amplitude control register and read power control register.

HF pulse waveform control provided by the optical disc drive according to the present embodiment will now be described with reference to FIGS. 15, 16, 17A, 17B, and 17C. FIG. 16 is a schematic diagram illustrating the overall configuration of the optical disc drive according to the present embodiment. As is the case with the first and second embodiments, the optical disc drive 18 shown in FIG. 16 includes, for instance, a spindle (not shown), an optical pickup 16, and a read/write signal processing system 17. The spindle retains an optical disc 10, which is a portable recording medium. The optical pickup 16 irradiates the optical disc 10 with a laser beam and detects light reflected from the optical disc 10. The read/write signal processing system 17 processes the light emitted from the optical pickup 16 or a signal detected by the optical pickup 16 during a read or write operation.

Figure 15:
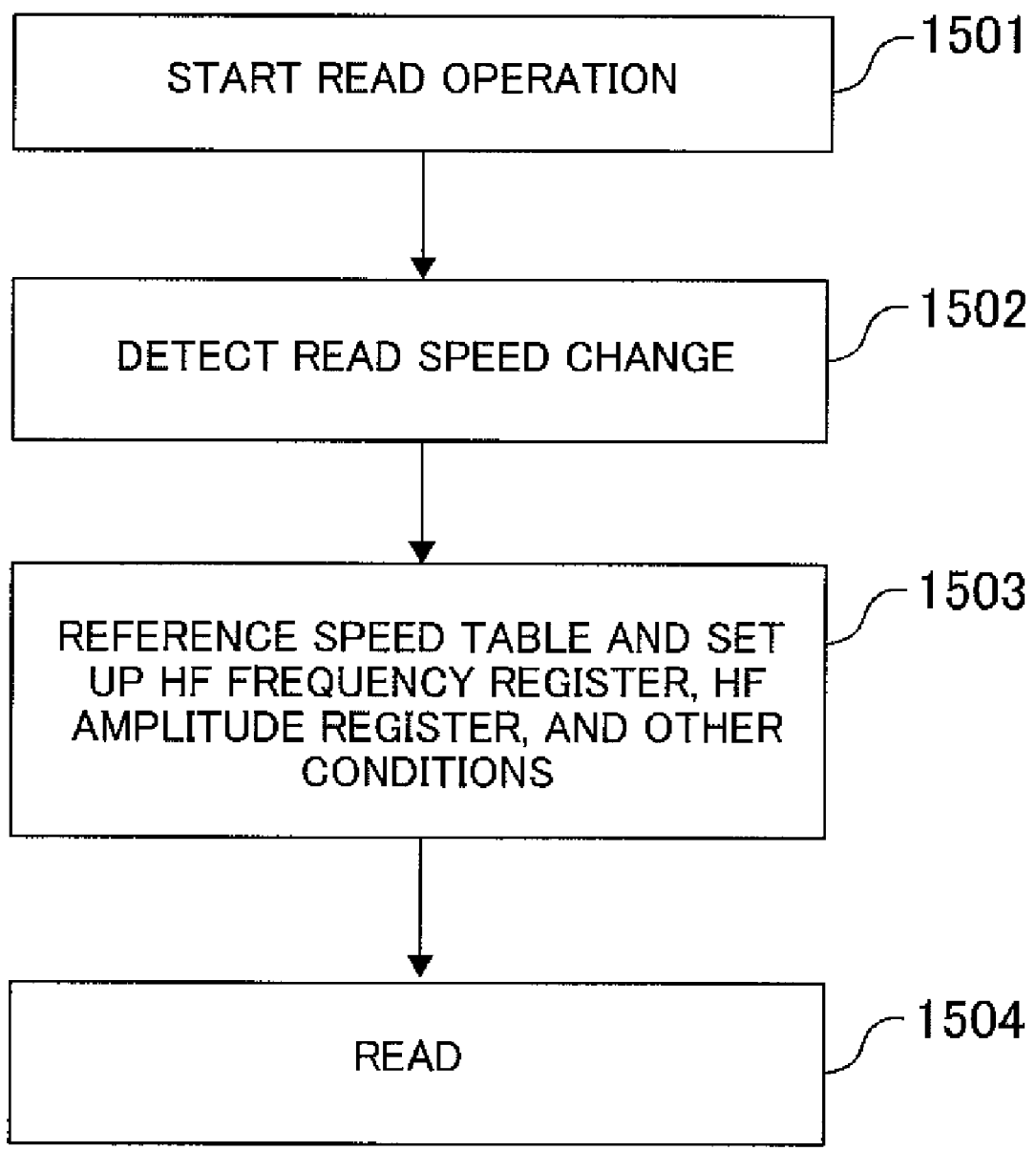
FIG. 15 is a flowchart illustrating how pulse waveform control is exercised by an optical disc drive according to a third embodiment.
Figure 16:
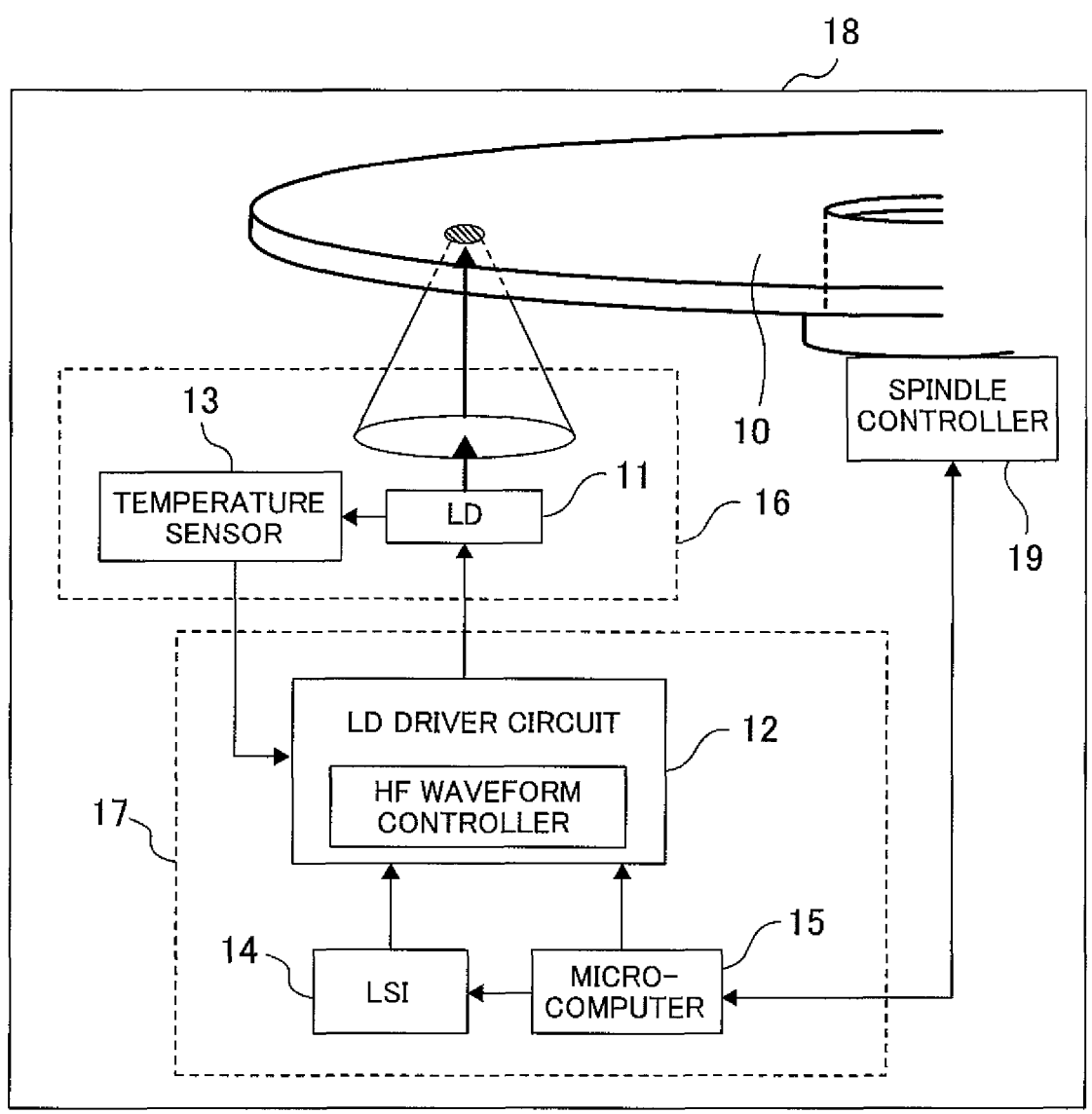
FIG. 16 is a diagram illustrating the overall configuration of the optical disc drive according to the third embodiment.

FIG. 15 is a flowchart illustrating how the optical disc drive according to the present embodiment exercises HF pulse waveform control. If the read speed prevailing at the beginning of a read operation is 10× in step 1501 of FIG. 15 and it is to be reduced to 2× for some reason, the firmware operating in the microcomputer 15 instructs a spindle controller 19 to change the rotation speed of a spindle motor as appropriate for a read speed of 2×. When the rotation speed is changed, the spindle controller 19 transmits a response signal to the microcomputer 15 to indicate that the rotation speed is changed. Upon receipt of this signal, the firmware detects that the read speed is changed (step 1502).

The internal memory of the microcomputer 15 stores control tables shown in FIGS. 17A, 17B, and 17C. Upon detection of a change in the read speed, the firmware references each table stored in the internal memory, and transfers an appropriate register value to the LD driver circuit through the LSI 14 (step 1503). At first, HF pulse waveform frequency control is exercised. The firmware identifies a read speed range to which the detected spindle rotation speed belongs, references the HF frequency control register table shown in FIG. 17A, and selects a register value appropriate for the read speed range. Referring to the flowchart of FIG. 15, as the read speed changes from 10× to 2×, the frequency control register value is changed from b to a.

When the HF frequency is changed, the high-frequency characteristics change. Thus, it is necessary to control the HF pulse waveform amplitude as well. Consequently, an HF pulse waveform control system provided by the present embodiment prepares HF amplitude control register tables in accordance with the number of frequency control register values to be prepared, and changes the HF amplitude control register table to be referenced. As a read speed of 10× was previously used, the table in FIG. 17C was referenced for HF amplitude control register value setup. However, as the HF frequency is changed, the table to be referenced is changed from FIG. 17C to FIG. 17B to perform HF amplitude control register value setup.

When the above-described control process terminates, the read operation continues at a changed read speed (step 1504).

An exemplary configuration of the optical disc drive capable of controlling the HF frequency in accordance with a read speed has been described. The foregoing description assumes that a response from the spindle controller is used to detect a change in the read speed. However, the same functionality can be implemented, for instance, by a wobble frequency detector.

When the read speed varies from inner tracks to outer tracks during a CAV (Constant Angular Velocity) read operation or the employed drive supports multiple read speeds, the third embodiment makes it possible to deliver optimum read performance during a read operation.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical disc drive that reads information recorded on an optical disc by irradiating the optical disc with high-frequency superposed laser light, the optical disc drive comprising:

a laser light source configured to emit the laser light;

a laser driver configured to supply a drive current to the laser light source, the drive current being obtained by superposing a high-frequency current over a direct current;

a microcomputer configured to execute firmware, which controls the overall operation of the optical disc drive; and a section configured to estimate the resistance or differential resistance of the laser light source;

wherein the firmware is configured to determine the amplitude of the high-frequency current in accordance with the estimated resistance or differential resistance.

2. The optical disc drive according to claim 1, further comprising:
a section configured to measure the potential of the laser driver;
wherein the firmware is configured to calculate the resistance or differential resistance in accordance with the measured potential of the laser driver.

3. The optical disc drive according to claim 1, further comprising:
a temperature measurement section configured to measure the temperature of the laser light source; and
a table configured to convert the measured temperature to the resistance or differential resistance;
wherein the firmware is configured to estimate the resistance or differential resistance in accordance with a value stored in the table.

4. The optical disc drive according to claim 1, wherein the laser driver includes:
an amplitude control register configured to store an amplitude value of the high-frequency current, and
a read power control register configured to store an amplitude value of the laser drive current.

5. The optical disc drive according to claim 4, wherein the laser driver further includes:
a frequency control register configured to store the frequency of the high-frequency current.

6. An optical information read method for using an optical disc drive including a laser light source configured to emit laser light, a laser driver configured to supply a drive current to the laser light source, the drive current being obtained by superposing a high-frequency current over a direct current, and a microcomputer configured to execute firmware, which controls the overall operation of the optical disc drive, and reading information recorded on an optical disc by irradiating the optical disc with the high-frequency superposed laser light, the optical information read method comprising:
estimating the resistance or differential resistance of the laser light source; and
determining the amplitude of the high-frequency current in accordance with the estimated resistance or differential resistance.

7. The optical information read method according to claim 6, further comprising:
measuring the resistance or differential resistance.

8. An optical disc drive capable of reading information from an optical disc at a plurality of read speeds or writing information on the optical disc at a plurality of write speeds, the optical disc drive comprising:
a laser light source configured to emit laser light;
a laser driver configured to supply a drive current to the laser light source, the drive current being obtained by superposing a high-frequency current over a direct current;
a microcomputer configured to execute firmware, which controls the overall operation of the optical disc drive;
a section configured to detect a read speed or a write speed;
wherein the firmware changes the frequency of the high-frequency current in accordance with the read speed or the write speed; and
a section configured to estimate a resistance or differential resistance of the laser light source;
wherein the firmware is configured to determine the amplitude of the high-frequency current in accordance with the estimated resistance or differential resistance.

9. The optical disc drive according to claim 8, further comprising:
a control table configured to store the read speeds or write speeds and the frequencies of the high-frequency current, which correspond to the read speeds or write speeds.

\* \* \* \* \*